United States Patent
Barnes et al.

(10) Patent No.: US 9,366,838 B2
(45) Date of Patent: Jun. 14, 2016

(54) SECURE CABLE HOUSING SYSTEM FOR OPTICAL COMMUNICATION NETWORK

(71) Applicant: Corning Cable Systems LLC, Hickory, NC (US)

(72) Inventors: Ray Samuel Barnes, Hickory, NC (US); Brent Michael Frazier, Haslet, TX (US); Trampus Lee Landrum, Hickory, NC (US); Lee Wayne Nored, Watauga, TX (US)

(73) Assignee: Corning Cable Systems LLC, Hickory, NC (US)

(*) Notice: Subject to any disclaimer, the term of this patent is extended or adjusted under 35 U.S.C. 154(b) by 108 days.

(21) Appl. No.: 14/084,063

(22) Filed: Nov. 19, 2013

(65) Prior Publication Data

US 2015/0139598 A1      May 21, 2015

(51) Int. Cl.
*G02B 6/00*      (2006.01)
*G02B 6/44*      (2006.01)

(52) U.S. Cl.
CPC .............. *G02B 6/4469* (2013.01); *G02B 6/445* (2013.01); *G02B 6/4448* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 6,980,725 B1* | 12/2005 | Swieconek | 385/135 |
| 8,705,929 B2* | 4/2014 | Kowalczyk et al. | 385/135 |
| 2006/0153516 A1* | 7/2006 | Napiorkowski et al. | 385/135 |
| 2009/0190896 A1* | 7/2009 | Smith et al. | 385/135 |
| 2009/0269019 A1* | 10/2009 | Andrus et al. | 385/135 |
| 2010/0310221 A1* | 12/2010 | Le Dissez | 385/135 |

* cited by examiner

*Primary Examiner* — Eric Wong

(57) ABSTRACT

A secure cable housing system for use within a secure fiber optic communications network is provided. The secure cable housing system includes a non-secure cable box and a secure equipment box. The secure network equipment box includes a secure interior cavity, and the non-secure cable box is smaller than the secure interior cavity such that the non-secure cable box fits within the secure interior cavity. The secure network equipment box allows the optical cable to be received into the secure interior cavity without disconnecting the fiber optic cable from the non-secure box.

11 Claims, 10 Drawing Sheets

SECURE CABLE HOUSING SYSTEM FOR OPTICAL COMMUNICATION NETWORK

BACKGROUND

1. Field

The disclosure relates generally to secure fiber optic networks and more particularly to cable and equipment housings for use within secure fiber optic networks.

2. Technical Background

Within the optical network, various cable boxes (e.g., zone boxes, desktop boxes, etc.) are used to aggregate, secure, connect and split optical cables out to end users and to connect to various electronics used to distribute fibers within the communications network. An optical network terminal (ONT) is a network interface device that allows connection between an optical network and another network type (e.g., Ethernet) or a particular device (e.g., a desktop computer, a telephone, fax machine, etc.). A protected distribution system (PDS) is a fiber optic communication network that includes various safeguards to permit its use for the unencrypted transmission of sensitive or classified information. For example, in a PDS, optical fibers may be located within hardened or interlocking armored cable or within conduit that limits physical access to the fibers. In such a PDS, the aggregation, connection or split points of the fiber optic cables may be located within housings that are hardened and designed to prevent unauthorized access into the housing. In addition, some electronic devices, such as an ONT, may be located within a hardened housing to provide protection of the secure fiber and the output cable from the secured ONT. In addition, within a PDS, the optical fiber cables may be armored, and optical fiber cables and housings may be equipped with an alarm system such as Network Integrity's Interceptor.

SUMMARY

One embodiment of the disclosure relates to a secure cable housing system for use within a secure fiber optic communications network including a non-secure cable box. The non-secure cable box includes a plurality of walls defining a non-secure interior cavity, and at least one of the walls of the non-secure cable box is moveable between opened and closed positions to provide access to the non-secure interior cavity. The non-secure cable box includes a first opening through one of the walls configured to receive an optical cable into the non-secure interior cavity, and the non-secure cable box is configured to support the optical cable. The non-secure cable box includes a second opening through one of the walls configured to provide access to at least one optical fiber of the optical cable. The secure cable housing system includes a secure network equipment box. The secure network equipment box includes a bottom wall and a plurality of sidewalls coupled to the bottom wall. Each sidewall has an outer surface and an inner surface. The secure network equipment box includes a moveable wall coupled to the plurality of sidewalls. The bottom wall, the sidewalls and the moveable wall define a secure interior cavity, and the moveable wall is moveable between opened and closed positions to provide access to the secure interior cavity. The non-secure cable box is smaller than the secure interior cavity such that the non-secure cable box fits within the secure interior cavity. The secure network equipment box includes a locking mechanism configured to lock the moveable wall of the secure network equipment box in the closed position. The secure network equipment box includes a slot formed through a first sidewall of the plurality of sidewalls. The slot has an entrance at an edge of the first sidewall and a closed bottom end located within the first sidewall. The slot provides a passage extending between the outer surface and the inner surface of the first sidewall, and the slot allows the optical cable to be received through the first sidewall into the secure interior cavity without disconnecting the fiber optic cable from the non-secure box.

An additional embodiment of the disclosure relates to a secure network equipment box for use within a fiber optic communications network. The secure network equipment box includes a plurality of walls defining an interior cavity, an outer surface and an inner surface. The secure network equipment box includes at least one communication interface located within the interior cavity. The communication interface includes an internal port and an external port. The internal port is configured to receive a cable from an optical network terminal. The external port is accessible from an exterior of the secure network equipment box to receive a cable from a user. The secure network equipment box includes a door moveable between a closed position in which the door blocks access to the external port and an open position in which the access is provided to the external port. The secure network equipment box includes a locking mechanism configured to lock the door in the closed position.

An additional embodiment of the disclosure relates to a method of converting a non-secure optical network to a secure optical network. The method includes providing an optical cable coupled within a non-secure cable box. The method includes providing a secure network equipment box. The secure network equipment box includes a plurality of walls defining an interior cavity, an outer surface and an inner surface. One of the walls is a moveable wall moveable between opened and closed positions to provide access to the interior cavity. The secure network equipment box includes a locking mechanism configured to lock the moveable wall in the closed position. The secure network equipment box includes an opening extending through one of the plurality of walls sized to receive the optical cable. The method includes mounting the non-secure cable box within the interior cavity of the secure network equipment box such that optical cable extends through the opening without decoupling the non-secure cable box from the optical cable.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
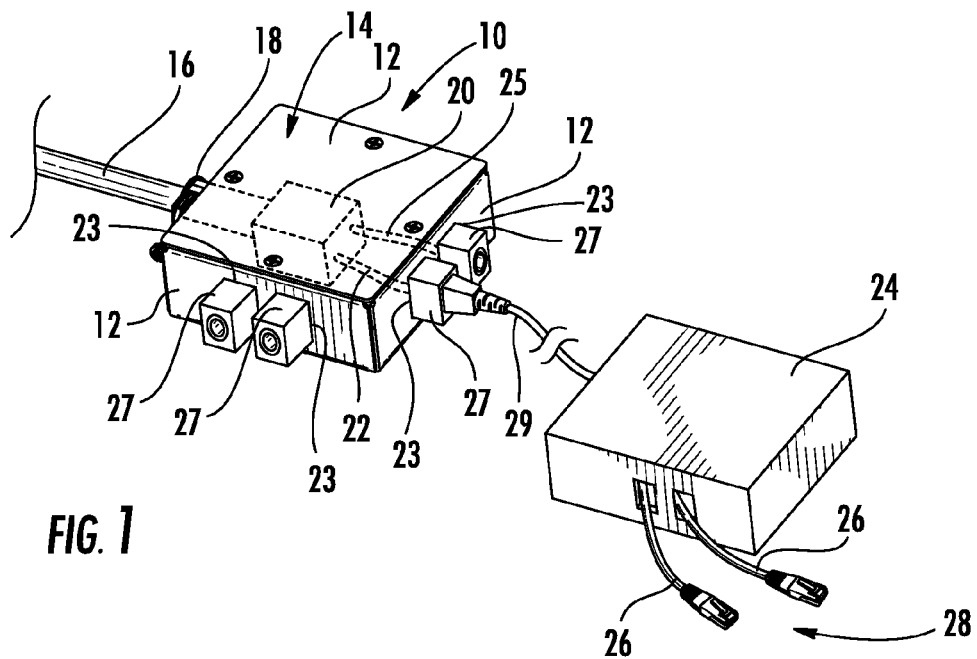
FIG. 1 is a perspective view of a non-secure cable box according to an exemplary embodiment.

Referring generally to the figures, various embodiments of a non-secure cable box and a secure network equipment housing are shown. In general, the non-secure cable box and secure network equipment housing discussed herein are configured to provide for efficient upgrade of a non-secure network to a secure network. In some embodiments, the secure network equipment housing discussed herein are configured to allow the upgrade to a secure network without interrupting network service. For example, in some network installations, optical fiber cables that are suitable for a PDS (e.g., armored optical cables, alarmed optical cables, etc.), may be installed in a facility before the full PDS network security is required. In these situations, a network or portion of a network may be operated as a non-secure network even though the optical cabling is equipped for a PDS. However, when the network operator requires that a previously non-secure portion of the network be upgraded to a secure network, various components of the network may need to be secured. In various embodiments, the aggregation and split points for an optical fiber cable may need to be secured, and various ONTs may need to be secured to carry the sensitive or classified data in compliance with secure network regulations.

In various embodiments discussed herein a non-secure cable box is provided. The non-secure cable box is configured to couple (e.g., "land") an armored optical fiber cable and optical connector allowing a non-secure optical data fiber from the optical fiber cable to be coupled to a non-secure ONT. To facilitate the efficient upgrade of the non-secure network to a secure network, various embodiments of a secure network equipment housing are provided. The secure network equipment housing provides PDS-compliant access restriction to the interior cavity of the secure network equipment housing. In various embodiments, the secure network equipment housing is sized to receive the non-secure cable box and includes an opening or slot in one of the housing walls that allows the optical cable to be inserted into the secure network equipment housing without requiring the non-secure cable box to be decoupled from the optical cable. This configuration allows the network to be secured without losing service to a non-secure portion of the network. In addition, the housing may be configured to receive the cable while also providing the continuation of the secure requirements of the secure network equipment box.

In addition, the secure network equipment housing is sized to also hold a secure ONT within the secure network equipment housing. The secure network equipment housing also includes an access limited exit port that allows for the exit of cabling (e.g., power cables, a non-secure fiber from the cable, etc.) to exit the secure network equipment housing while at the same time being constructed to limit unauthorized access (e.g., via optical probe or sniffing device) through the exit hole into the secure network equipment housing.

In various embodiments, the secure network equipment housing discussed herein also includes features that allow for convenient use and access of the secure ONT that is located with the secure network equipment housing. In some such embodiments, the secure network equipment housing includes a communication interface that has an interior port that is located within the secure interior cavity of the secure cable box. The interior port is configured to receive a cable (e.g., an Ethernet cable) from the secure ONT. The communication interface also includes an exterior port that is configured to receive a cable (e.g., an Ethernet cable from a computer, from a VoIP phone, from a scanner, etc.) from a user.

In various embodiments, the exterior port may also be accessible through a locked door of the secure network equipment housing. Within a secure network the user must unplug from and lock the ONT within the secure network equipment housing every time the user leaves the workstation to maintain security of the network. Thus, the user facing Ethernet ports of a secure network device see a large number of unplug and plug-in cycles. However, the typical Ethernet port is typically rated to handle a relatively low number of unplug and plug-in cycles (e.g., 700-800 cycles) after which the port may wear out. The communication interface of the secure network equipment housing discussed herein allow for replacement of the user facing Ethernet ports when worn out without requiring replacement of the ONT.

In addition, in some embodiments, the secure network equipment housing discussed herein allows the typical user convenient access to the exterior user facing Ethernet port and thus data access to the secure ONT without requiring the user to access the entire inner cavity of the secure cable box. Limiting network user access to the interior of the secure cable box can limit the potential for accidental damage to the optical fibers and electronics within the interior cavity of the secure cable box by limiting unneeded access to the secure interior cavity of the secure network equipment housing.

Referring to FIG. 1, a non-secure cable box 10 is shown according to an exemplary embodiment. Non-secure cable box 10 includes a plurality of walls 12 that define an non-secure interior cavity 14. In various embodiments, at least one of the walls (e.g., a top wall) is moveable or removable between opened and closed positions to allow access to cavity 14. An optical fiber cable 16 extends through an opening 18 through one of the walls 12 into cavity 14. A component 20 may be coupled to the end of cable 16 that is received within cavity 14. In various embodiments, component 20 may be a furcation plug supporting and splitting individual fibers from optical fiber cable 16. In some embodiments, component 20 may include a stress-relief device such as a stress-relief bracket configured to protect optical fiber cable 16 within non-secure cable box 10 from mechanical stresses. In various embodiments, optical fiber cable 16 may be an armored and/or alarmed optical fiber cable configured for use within a PDS. In such embodiments, component 20 includes one or more feature configured to engage or bond with the armored or alarmed cable 16. In one embodiment, cable 16 includes at least four optical fibers; one optical fiber carries non-secure data, a second optical fiber carries secure data, and two of the optical fibers are alarm fibers.

Generally, within non-secure cable box 10, one or more non-secure optical fibers 22 are split from cable 16. In the embodiment shown, one or more secure data optical fibers 25 remain unused located within cable box 10. Secure optical fibers 25 may be used when the network is upgraded to handle secure communication as discussed below. In various embodiments, non-secure cable box 10 includes a plurality of openings 23 through the sidewalls of box 10. In various embodiments, openings 23 may be located on three of the sidewalls of box 10.

In general, openings 23 provide access to a non-secure optical fiber 22. In the embodiment shown, non-secure cable box 10 includes a plurality of adapters 27 that extend through openings 23 that allow a communication cord (e.g., a patch cord, optical fiber jumper, etc.) to be communicably coupled with non-secure optical fiber 22. As shown, non-secure optical fiber 22 engages one of the adapters 27 that provides coupling to an external communication fiber, shown as patch cord 29. Patch cord 29 couples non-secure optical fibers 22 to a network device, such as ONT 24, and user cables, shown as Ethernet cables 26 may extend to user devices (e.g., user computers, VoIP phones, printers, scanners, etc.). As shown in FIG. 1, a PDS equipped optical fiber cable 16 may initially be configured for use as a non-secure access point 28 (e.g., use with a non-secure ONT and non-secure end users). In various embodiments, non-secure cable box 10 is approximately 4 inches wide, 4 inches deep and 1.5 inches tall.

In various embodiments, non-secure cable box 10 may include additional openings through various walls of box 10 to provide additional functionality. For example, non-secure cable box 10 may include a third set of openings through one of the walls configured to provide bonding/grounding capabilities for armored cables. In addition, non-secure cable box 10 may also include a fourth set of openings through one of the walls configured to provide mounting capabilities to a hardened surface.

Figure 2:
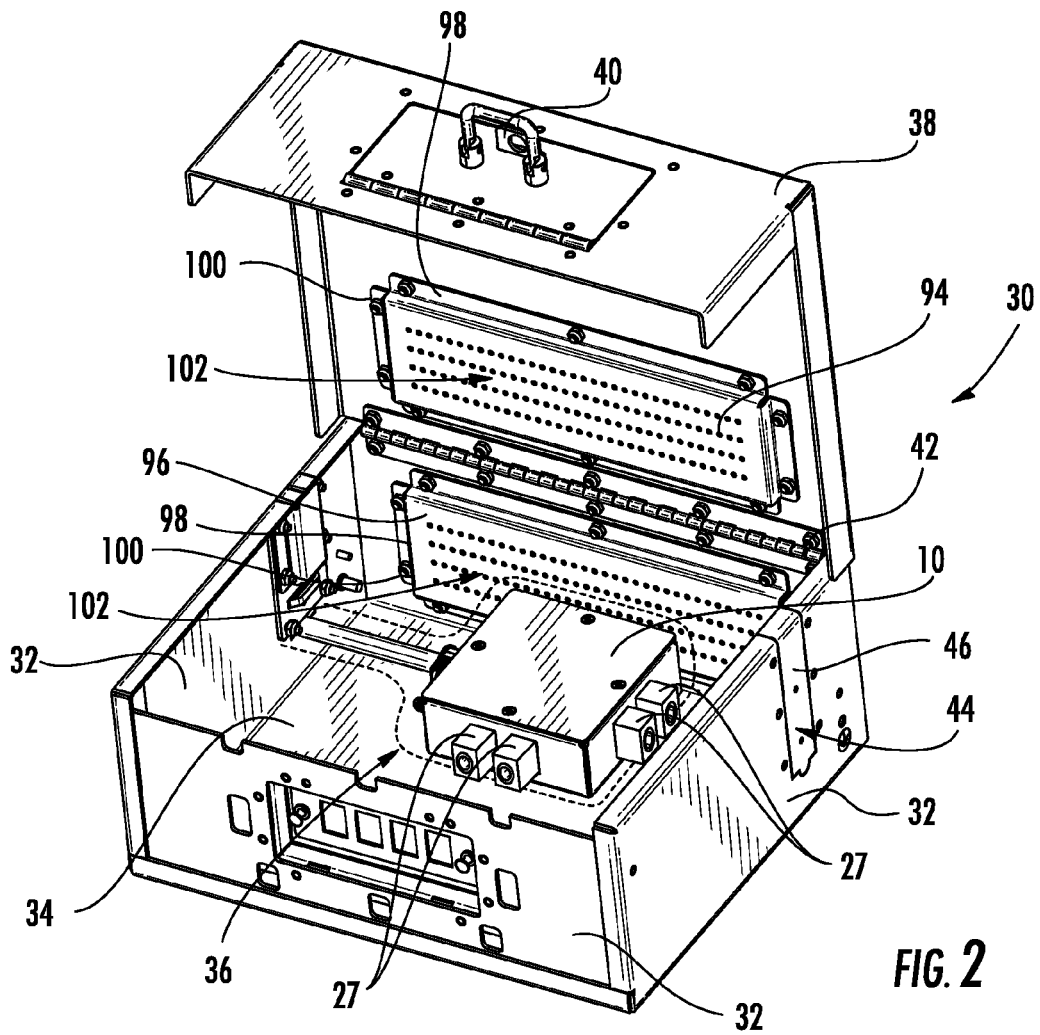
FIG. 2 is a perspective view of a secure equipment box with the lid in the open position according to an exemplary embodiment.
Figure 3:
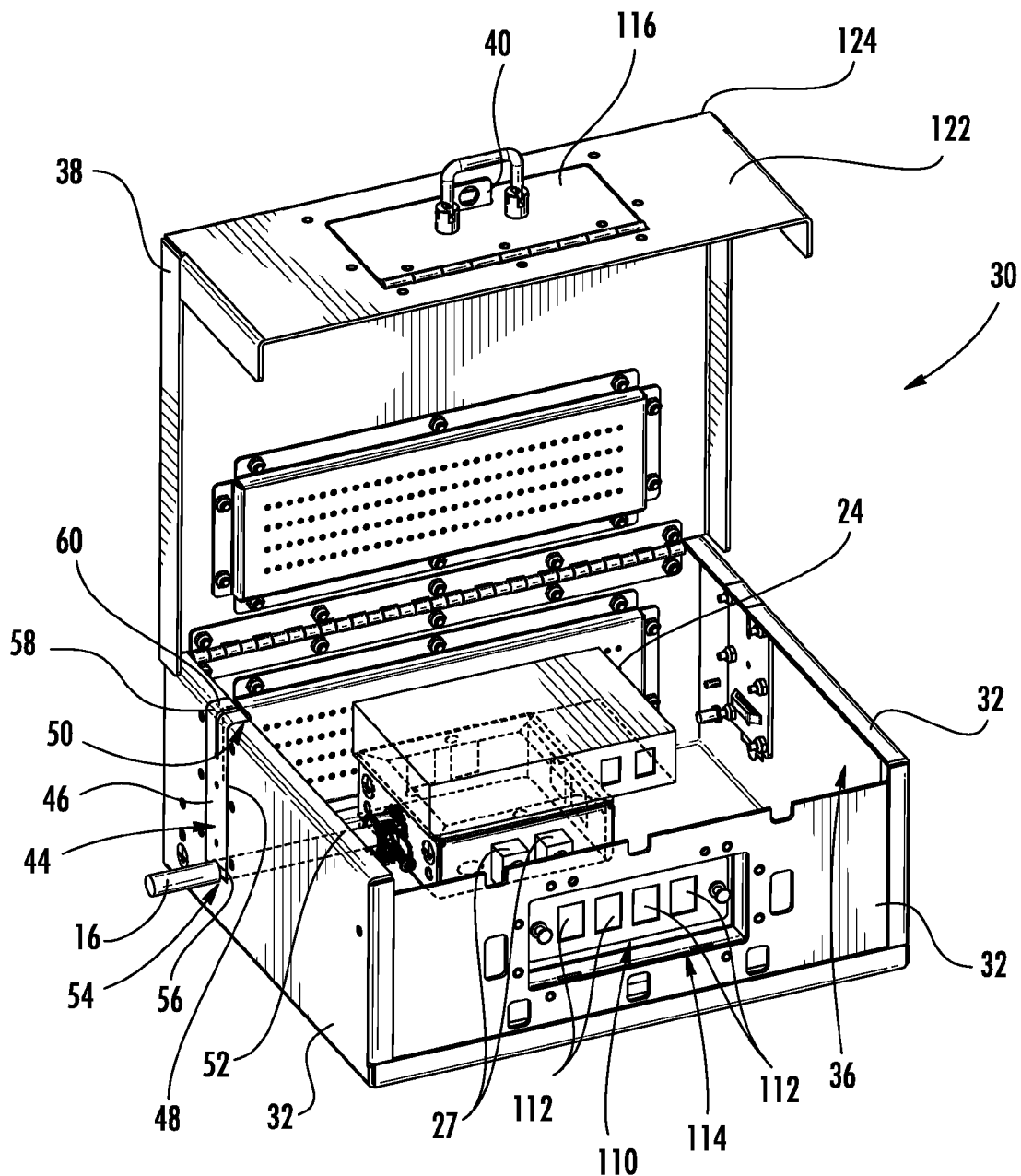
FIG. 3 is another perspective view of the secure equipment box of FIG. 2 with the lid in the open position according to an exemplary embodiment.

Referring to FIG. 2 and FIG. 3, a secure network equipment box, shown as equipment box 30, may be utilized to convert non-secure access point 28 (shown in FIG. 1) to a secure network access point that is PDS compliant. Referring generally to FIG. 2 and FIG. 3, box 30 is a rigid, strong lockable equipment housing sized to receive non-secure cable box 10 and ONT 24.

Referring to FIG. 2 and FIG. 3, equipment box 30, is shown according to an exemplary embodiment. Secure equipment box 30 includes four sidewalls 32 and a bottom wall 34. Inner surfaces of sidewalls 32 and bottom wall 34 generally define a secure interior cavity 36. A top wall or lid 38 is coupled to sidewalls 32, and when closed acts to securely seal interior cavity 36 of equipment box 30. As shown in FIG. 2 and FIG. 3, interior cavity 36 is sized to receive non-secure cable box 10 and a variety of makes and models of ONT 24. In the embodiment shown, equipment box 30 is configured to receive non-secure cable box 10 along the inner surface of bottom wall 34, and ONT 24 is mounted on top of non-secure cable box 10. In various embodiments, equipment box 30 may include one or more securing devices (e.g., brackets, straps, bands, etc.) configured to engage non-secure cable box 10 and/or ONT 24 to secure those components within equipment box 30.

For use within a PDS, lid 38 includes a locking mechanism that can be locked following installation of non-secure cable box 10, optical cable 16 and ONT 24 into cavity 36 to prevent unauthorized access into equipment box 30. In various embodiments, the locking mechanism includes a loop or ring 40 coupled to box 30 that is configured to receive a lock, such as a pad lock, that is coupled through ring 40 to secure box 30 in a locked position. In another embodiment, box 30 may include an integrated key lock or combination lock. In various embodiments, lid 38 is coupled to one of the sidewalls via a hinge 42 that allows the lid to pivot between opened and closed positions to block access to interior cavity 36.

In various embodiments, equipment box 30 is configured to receive cable 16 and non-secure cable box 10 without decoupling non-secure cable box 10 from cable 16. This arrangement allows network access point 28 to be upgraded to support PDS compliant secured users without losing use of the non-secure portion of the network. Specifically, the point within the network at which the optical fibers of cable 16 exit the armored and/or alarmed cable 16 is located initially within non-secure cable box 10, and thus, this fiber access point is therefore initially non-secure. Equipment box 30 allows for physically securing the non-secure fiber access point that is initially within non-secure cable box 10 without disconnecting and reconnecting the cable fiber access point within equipment box 30.

Referring to FIG. 2 and FIG. 3, equipment box 30 includes one or more slots 44 formed through one or more walls of equipment box 30. Referring to FIG. 3, a first slot 44 is formed through left sidewall 32. FIG. 3 shows equipment box 30 following assembly and shows a plug 46 received within and blocking slot 44. An edge 48 located within left sidewall 32 defines slot 44 as shown in FIG. 3. Slot 44 includes an opening or entrance 50 that is located along upper edge 52 of left sidewall 32. To secure network access point 28 using secure equipment box 30, optical cable 16 is coupled within non-secure box 10, optical cable 16 is received through slot entrance 50 and is moved downward toward closed slot bottom end 54. In this arrangement, optical cable 16 is located within slot 44 and extends through left sidewall 32 into cavity 36 of equipment box 30. Because slot 44 allows cable 16 to be installed through sidewall 32 in the middle of the cable body (as opposed to threading cable 16, end first through a sidewall hole), slot 44 allows cable 16 to be received within secure equipment box 30 without decoupling cable 16 from non-secure box 10.

Following installation of cable 16 into secure equipment box 30, plug 46 is installed into the portion of slot 44 not occupied by cable 16. In the embodiment shown, plug 46 includes a curved lower edge 56 shaped to substantially match the outer diameter of cable 16 such that the gap between lower edge 56 and cable 16 is PDS compliant. Plug 46 has an upper section 58 having an upper end surface 60 that is substantially coplanar with upper edge 52 of sidewall 32. As shown in FIG. 2, equipment box 30 may also include a second slot 44 located through right sidewall 32 and a corresponding additional plug 46. In various embodiments equipment box 30 includes multiple slots 44 to provide flexibility in integration into a particular network depending on the physical location of cable 16 relative to the position that box 30 will be located at.

Figure 4:
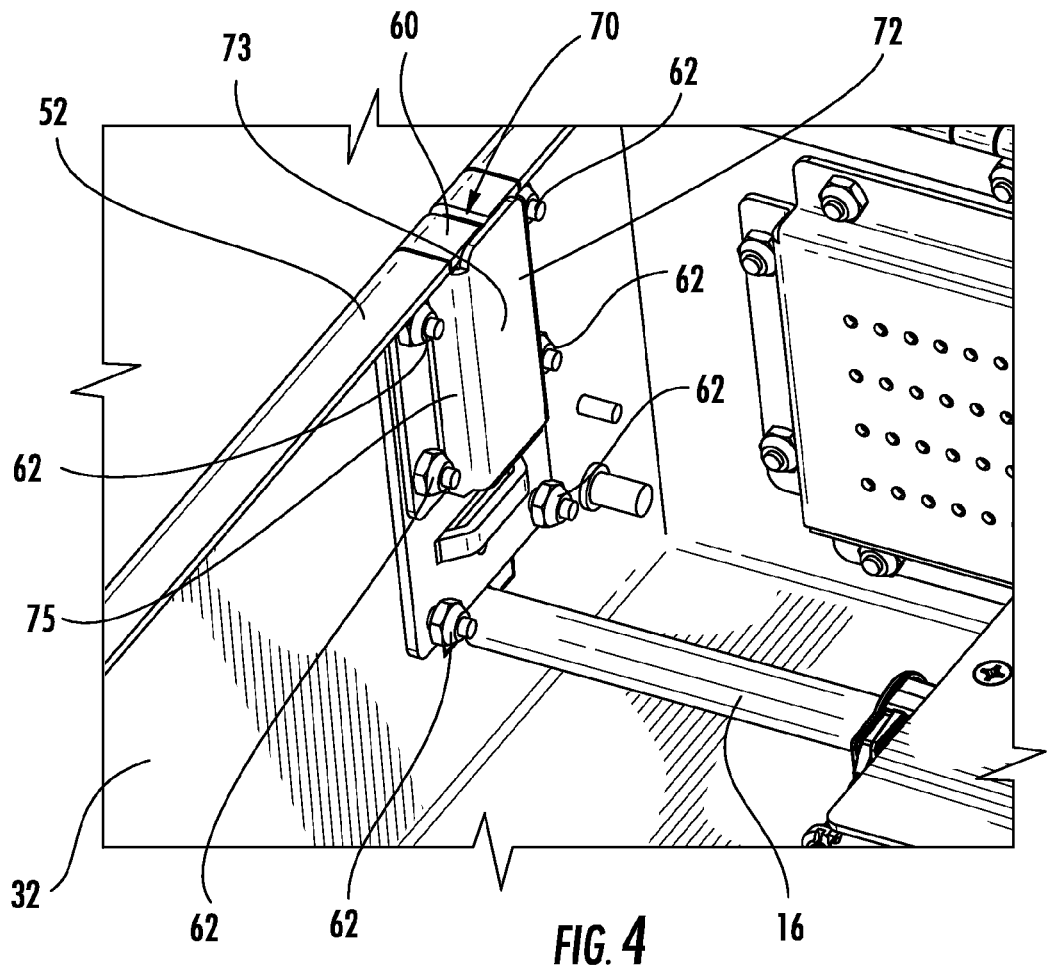
FIG. 4 is a detailed perspective view of a bracket within the secure equipment box of FIG. 2 according to an exemplary embodiment.

Referring to FIG. 4, a plurality of fasteners 62 are coupled to the inner surface of sidewall 32 adjacent to slot 44. In the embodiment shown, fasteners 62 engage a portion of plug 46 to rigidly and securely hold plug 46 in place following installation of cable 16 into equipment box 30.

Figure 5:
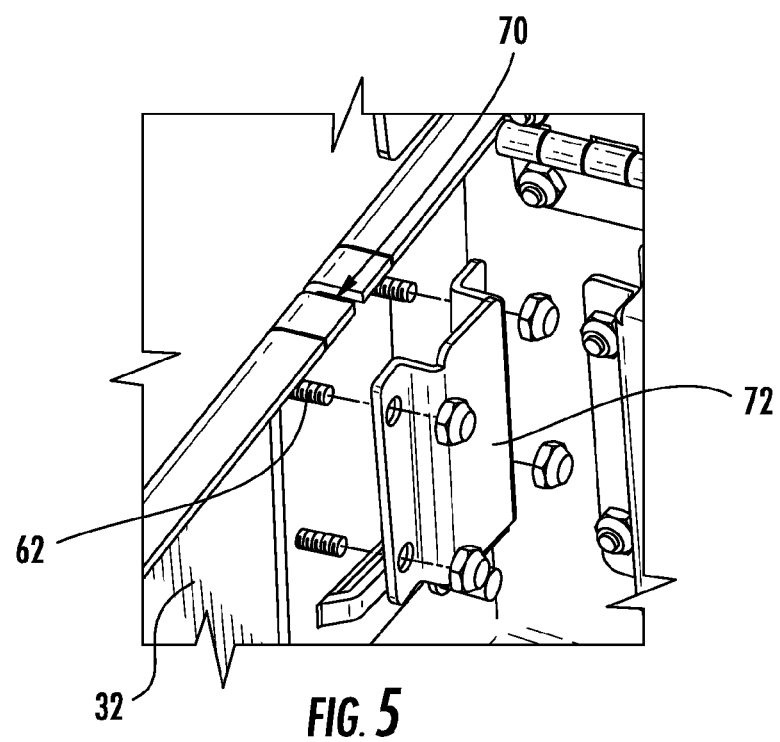
FIG. 5 is an exploded perspective view of the bracket of FIG. 4 according to an exemplary embodiment.
Figure 6:
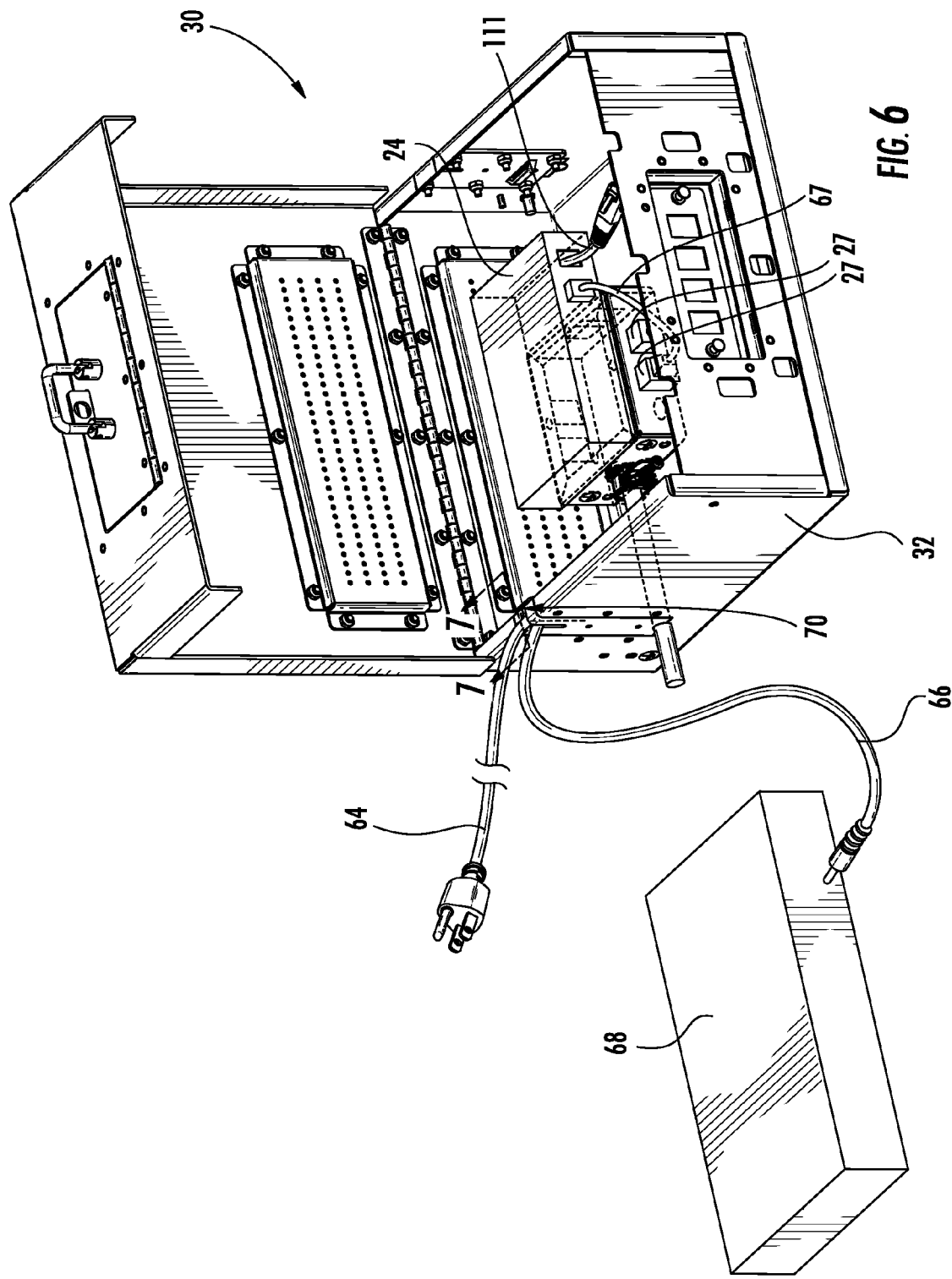
FIG. 6 is another perspective view of the secure equipment box of FIG. 2 showing a cable and optical fiber exiting the box according to an exemplary embodiment
Figure 7:
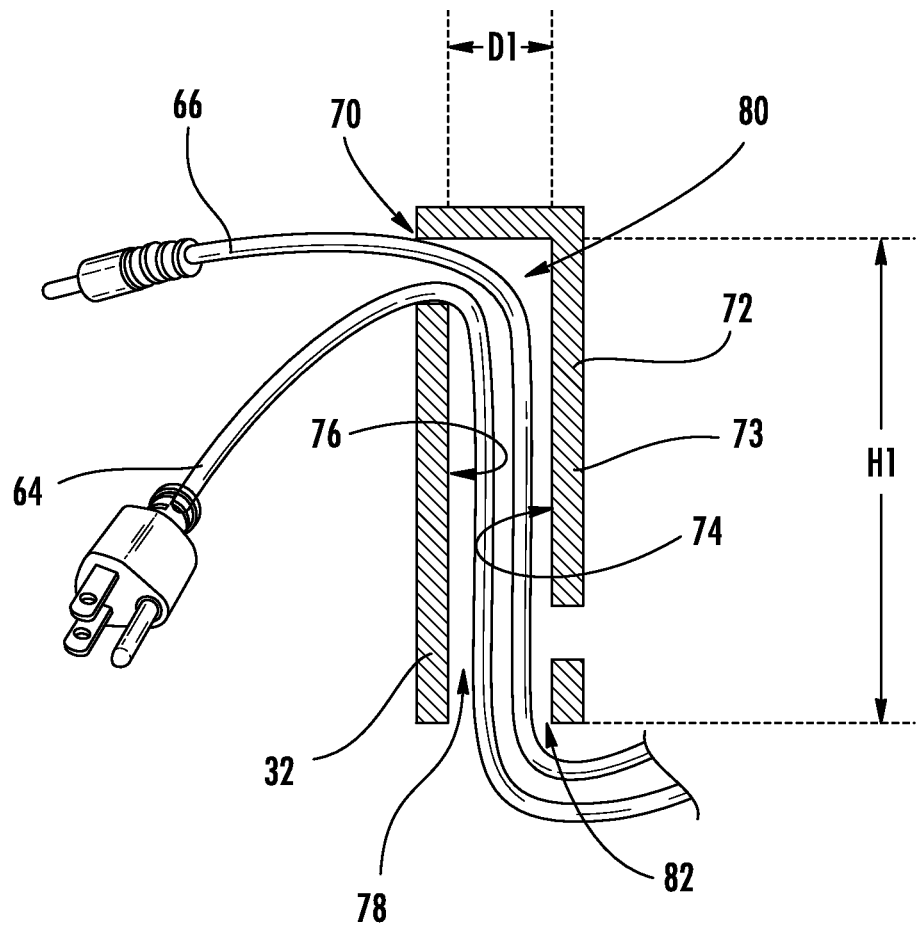
FIG. 7 is a detailed sectional view of the bracket of FIG. 4 according to an exemplary embodiment.

Referring to FIGS. 4-7, in various network installations one or more cable or fiber may exit equipment box 30. For example as shown in FIG. 6 and FIG. 7, a power cable 64 for ONT 24 may need to exit equipment box 30 to supply power to ONT 24. In addition, a non-secure network optical fiber 66 split from cable 16 may exit equipment box 30 to supply network services to non-secure network users via a non-secure ONT 68. In such embodiments, cable 16 includes at least one secure fiber, at least one non-secure communication fiber (e.g., fiber 66), and may include one or more alarm fibers. However to be compliant with the secure network application, the exit point for power cable 64 and non-secure optical fiber 66 is configured to limit potential un-authorized access into cavity 36 through the exit point. In addition, as shown in FIG. 6, an internal communication fiber, shown as internal patch cord 67, is shown coupling cable box 10 to ONT 24 within the interior of secure equipment box 30. Specifically, in this embodiment, secure fiber 25 (shown in FIG. 1) is coupled to one of the adapters 27 and patch cord 67 couples secure fiber 25 to ONT 24 within secure equipment box 30.

Referring to FIG. 4, equipment box 30 includes an opening 70. As shown in FIG. 6, opening 70 provides an exit point for power cable 64 and fiber 66 from equipment box 30. A bracket 72 is coupled to sidewall 32 adjacent opening 70. In the embodiment shown, fasteners 62 also couple bracket 72 to sidewall 32. As shown in FIG. 4 and FIG. 5, in general bracket 72 is a U-shaped bracket having a rear wall 73 coupled to bracket sidewalls 75. As shown rear wall 73 is substantially parallel to the inner surface of sidewall 32 and bracket sidewalls 75 extend from rear wall 73 substantially perpendicular to rear wall 73. As shown best in FIG. 7, bracket sidewalls 75 act to space rear wall 73 from box sidewall 32 to form a channel 78.

As shown in FIG. 7, bracket 72 includes outer surface 74 that faces inner surface 76 of sidewall 32 to form channel 78. Channel 78 has a first open end, shown as upper end 80, in the orientation of FIG. 7, and a second open end, shown as lower end 82. Upper end 80 is positioned adjacent opening 70 and lower end 82 is located to provide entrances from interior cavity 36. In this arrangement, bracket 72 defines a channel that allows power cable 64 and non-secure fiber 66 to extend from cavity 36, through lower end 82, into channel 78, through upper end 80 and out of box 30 through opening 70. In various embodiments, channel 78 is sized such that there is limited clearance between power cable 64 and fiber 66 and the surfaces defining channel 78, and in addition, the path into cavity 36 from opening 70 includes two tight 90 degree bends. In one embodiment fiber 66 is a bend insensitive optical fiber such as the ClearCurve® fiber from Corning Incorporated. Both the limited clearance and the bends created by bracket 72 limit or prevent unauthorized access (e.g., via optical probe) into interior cavity 36 from outside box 30 via opening 70. In various embodiments, channel 78 has a depth, shown as D1 and a height shown as H1, that are selected to limit unauthorized access into cavity 36. In various embodiments, D1 is less than H1, and in particular D1 is less than half of H1.

Figure 8:
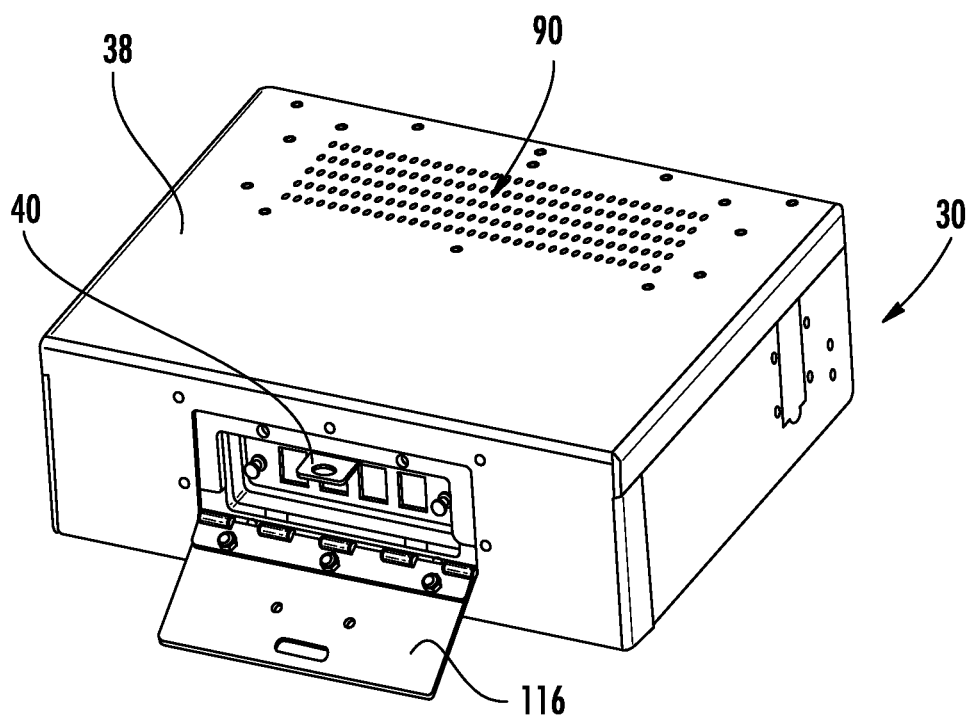
FIG. 8 is a perspective view of the secure equipment box of FIG. 2 with the lid in the closed position according to an exemplary embodiment.
Figure 9:
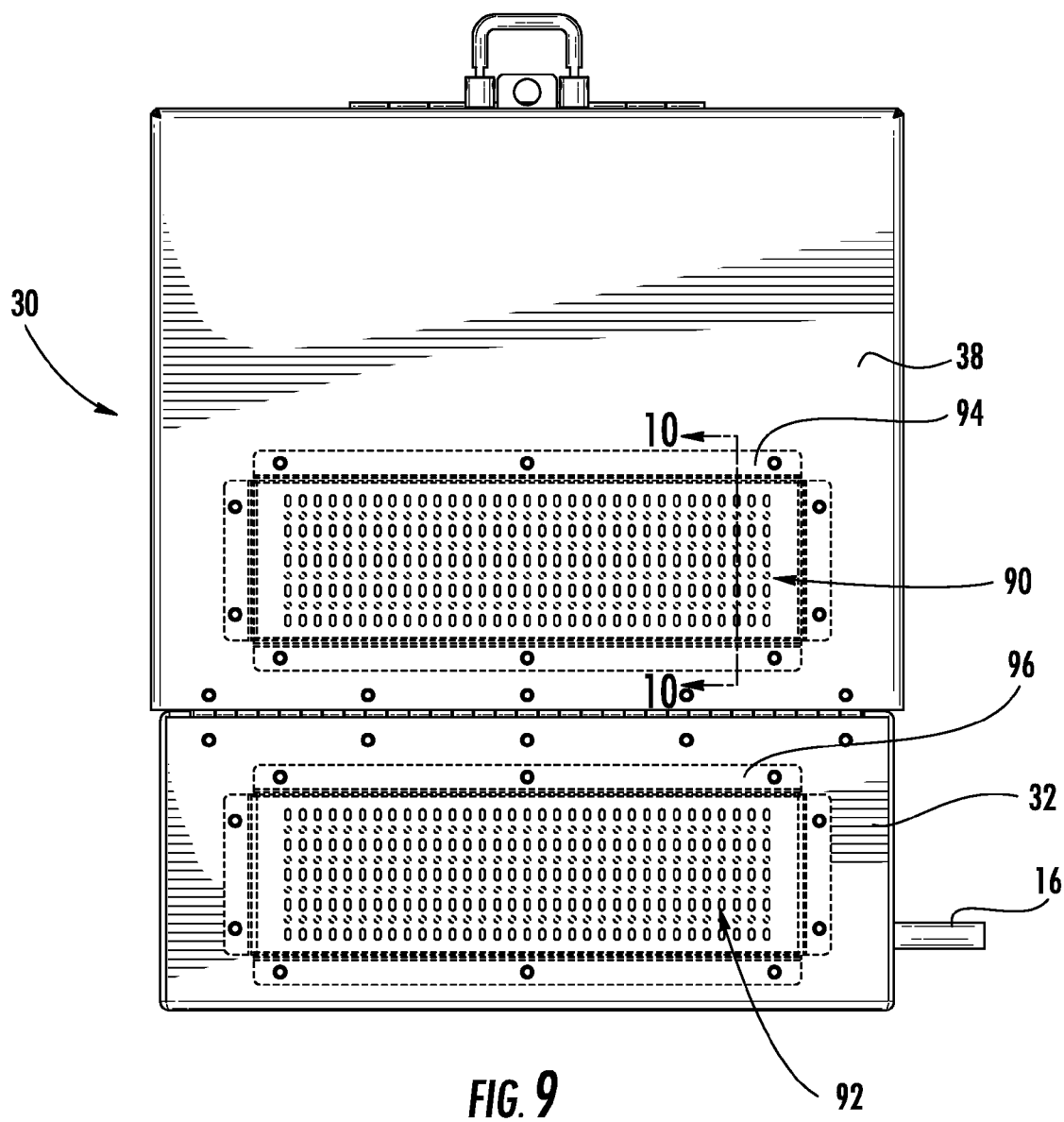
FIG. 9 is a rear view of the secure equipment box of FIG. 2 with the lid in the open position according to an exemplary embodiment.
Figure 10:
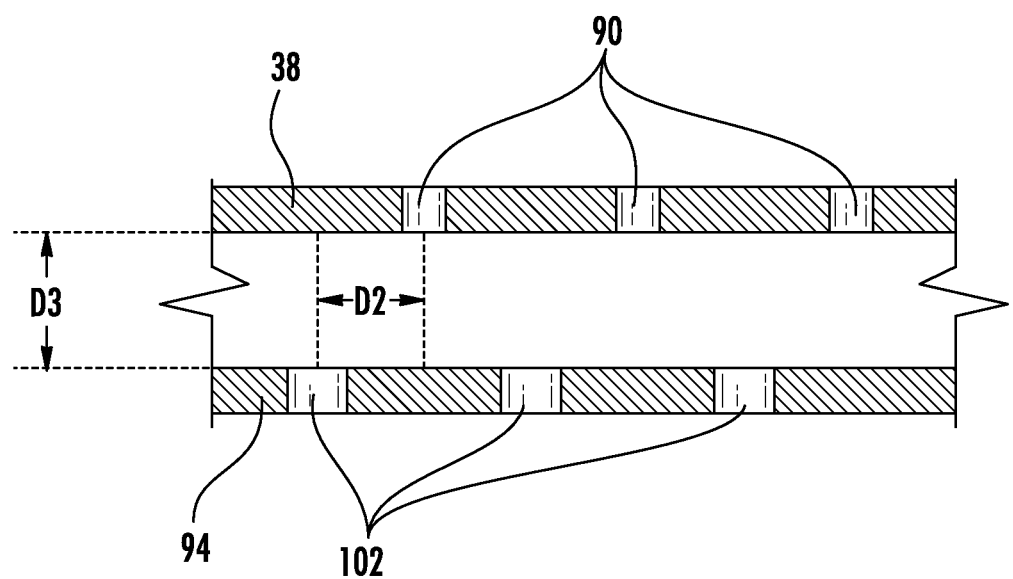
FIG. 10 is a detailed sectional view showing outer vent openings and a vent panel according to an exemplary embodiment.

Referring to FIGS. 8-10, in various embodiments, equipment box 30 includes a plurality of openings or vents to provide sufficient air flow to allow ONT 24 or other electronics within box 30 to be appropriately cooled. Referring to FIG. 8, lid 38 of equipment box 30 is shown in the closed position, and as shown, lid 38 includes an array of vent openings 90. Referring to FIG. 9, a rear view of equipment box 30 is shown with lid 38 in the open position, and as shown, rear sidewall 32 includes an array of vent openings 92.

In various embodiments, equipment box 30 is configured to limit potential unauthorized access of cavity 36 through vent openings 90 and 92. Referring to FIG. 2, equipment box 30 includes a vent panel 94 positioned between vent openings 90 (not visible in FIG. 2) and interior cavity 36, and also includes a vent panel 96 located between vent openings 92 (not visible in FIG. 2) and interior cavity 36. In the embodiment shown, vent panel 94 and vent panel 96 each include peripheral flanges 98 that are coupled via fasteners 100 to the inner surfaces of lid 38 and rear sidewall 32, respectively. As shown in FIG. 2, vent panels 94 and 96 each include an array of vent panel openings 102.

In general, vent panels 94 and 96 are configured to allow air flow between interior cavity 36 and the exterior of box 30 while also preventing or limiting unauthorized access (e.g., via optical probe) through vent openings 90 or 92. Referring to FIG. 10, a sectional view showing the positioning of vent array 90 and vent panel 94 is shown according to an exemplary embodiment. As shown, vent panel openings 102 of vent panel 94 are off-set from the array of outer vent openings 90 such that none of the outer vent openings 90 are aligned with the vent panel openings 102. In FIG. 9, vent panels 94 and 96 are shown in ghost lines demonstrating the off-set between the outer vent openings 90 and 92 and the vent panel openings 102. In such embodiments, the degree of off-set, shown as D2, and the spacing distance between the wall and the vent panel, shown as D3, are selected such that there is no straight path that extends through one of the outer vent openings 90 and one of the vent panel openings 102. In addition, the off-set distance D2 is also selected such that navigation through openings 90 and 102 via a flexible probe is difficult. In various embodiments, the ratio of D2 to D3 is between about 0.5 and 2. In various embodiments, a mesh material may be located in the space between the inner surface of the wall and the vent panel (i.e., the space shown as D3) that acts to further prevent penetration from outside sources as well as continue to provide heat dissipation. As will be understood, vent panel 96 may also be offset from outer vent openings 92 in a similar manner.

As noted above, ONT 24 provides for secure coupling of devices (e.g., computers, VoIP phones, scanners, printers, etc.) to the secure optical fiber network, typically via a copper based communication cable, such as an Ethernet cable. As shown, for example in FIG. 3, equipment box 30 includes a communication interface, shown as Ethernet patch panel 110. In general, patch panel 110 includes external user facing ports, shown as exterior Ethernet ports 112, that allow a user to plug in the cable for the user's device without directly plugging into ONT 24. As will be generally understood, patch panel 110 includes internal ports, for example internal Ethernet ports, to receive an Ethernet cable 111 (shown in FIG. 6) that extends from the ONT 24 to couple the ONT to patch panel 110. In this manner, patch panel 110 is a pass through connector allowing the user to access the secure fiber optic network without directly plugging the cable of the user's device into the ONT. In some embodiments, Ethernet ports are typically rated for 700 to 800 plug/unplug cycles before wearing out. Thus, patch panel 110 may act as a sacrificial series of ports that accommodates the larger number of plug-unplug cycles typical of a secure ONT. In such an embodiment, patch panel 110 that is separate from ONT 24 allows the network operators to replace patch panel 110 as ports 112 wear out as opposed to replacing the ONT which is typically required when the Ethernet port of the ONT fails. It should be understood that while patch panel 110 and ports 112 are shown as Ethernet ports, in various embodiments, patch panel 110 may be configured to couple to any cable type or cable standard that may be used within a communication network.

Figure 11:
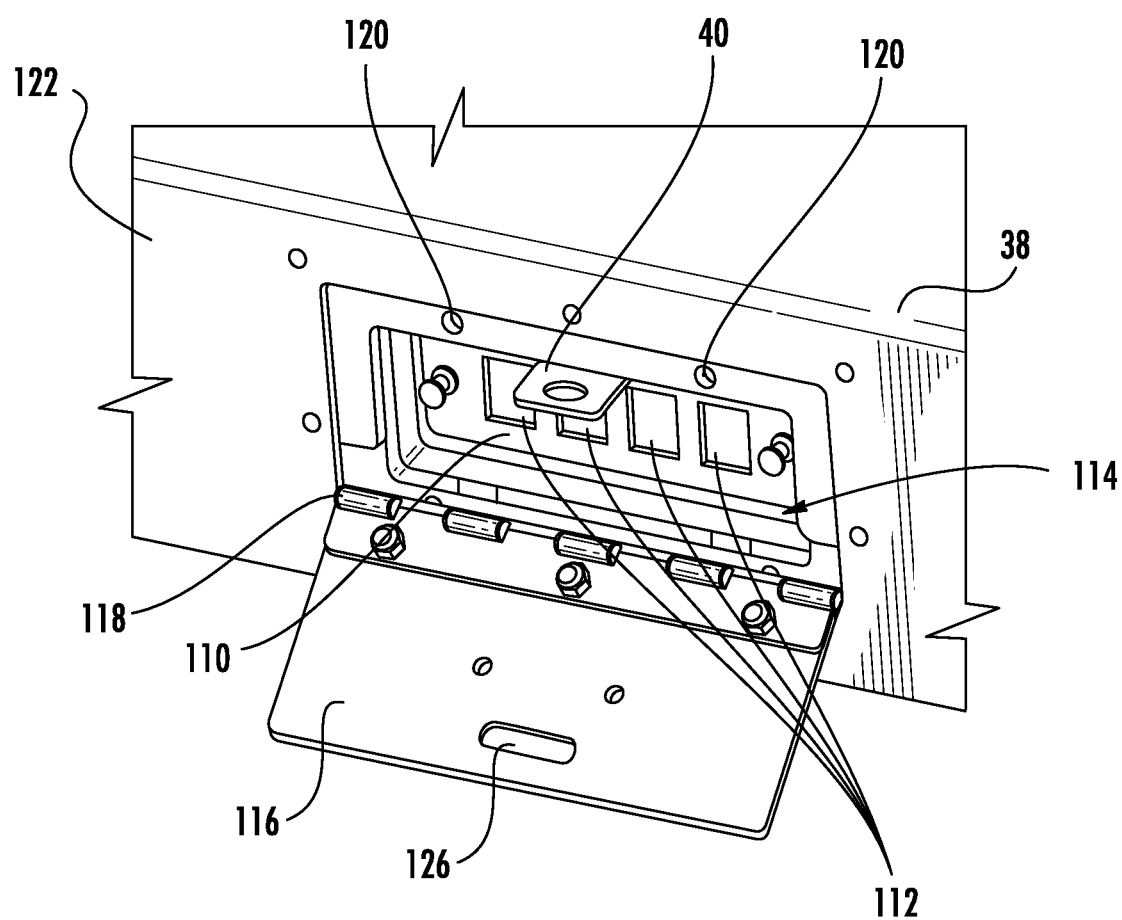
FIG. 11 is a detailed perspective view of external ports of the secure equipment box of FIG. 2 according to an exemplary embodiment.

As shown in FIG. 3, lid 38 includes a front skirt 122. Front skirt 122 extends away from and substantially perpendicular from corner 124 of lid 38. In this embodiment, front sidewall 32 includes an opening 114 through which ports 112 of patch panel 110 are accessible. Referring to FIG. 11, a detailed view of front skirt 122 is shown following closure of lid 38. A door 116 is coupled to front skirt 122 by hinges 118. Door 116 is moveable between a closed position in which door 116 blocks access to ports 112, and an open position (shown in FIG. 11) in which the access is provided to ports 112.

In the embodiment shown, lid 38 is coupled to front sidewall 32 in the closed position by fasteners 120. As shown, fasteners 120 pass through both front skirt 122 and front sidewall 32 to couple lid 38 in the closed position. As can be seen in FIG. 11, when door 116 is moved to the closed position, door 116 also blocks access to fasteners 120.

To facilitate secure locking, door 116 includes an opening 126. When door 116 is closed, lock ring 40 extends through opening 126, and door 116 may be locked in the closed position by placing a padlock through lock ring 40. Thus, with this arrangement, equipment box 30 is configured such that a single padlock coupled through lock ring 40 secures door 116 to block access to ports 112 and also to block access to fasteners 120 which prevents the unauthorized opening of lid 38. In addition, use of fasteners 120, such as screws or bolts, to maintain lid 38 in the closed position, acts to limit the causal or accidental access of interior cavity 36 by an authorized user of equipment box 30.

Figure 12:
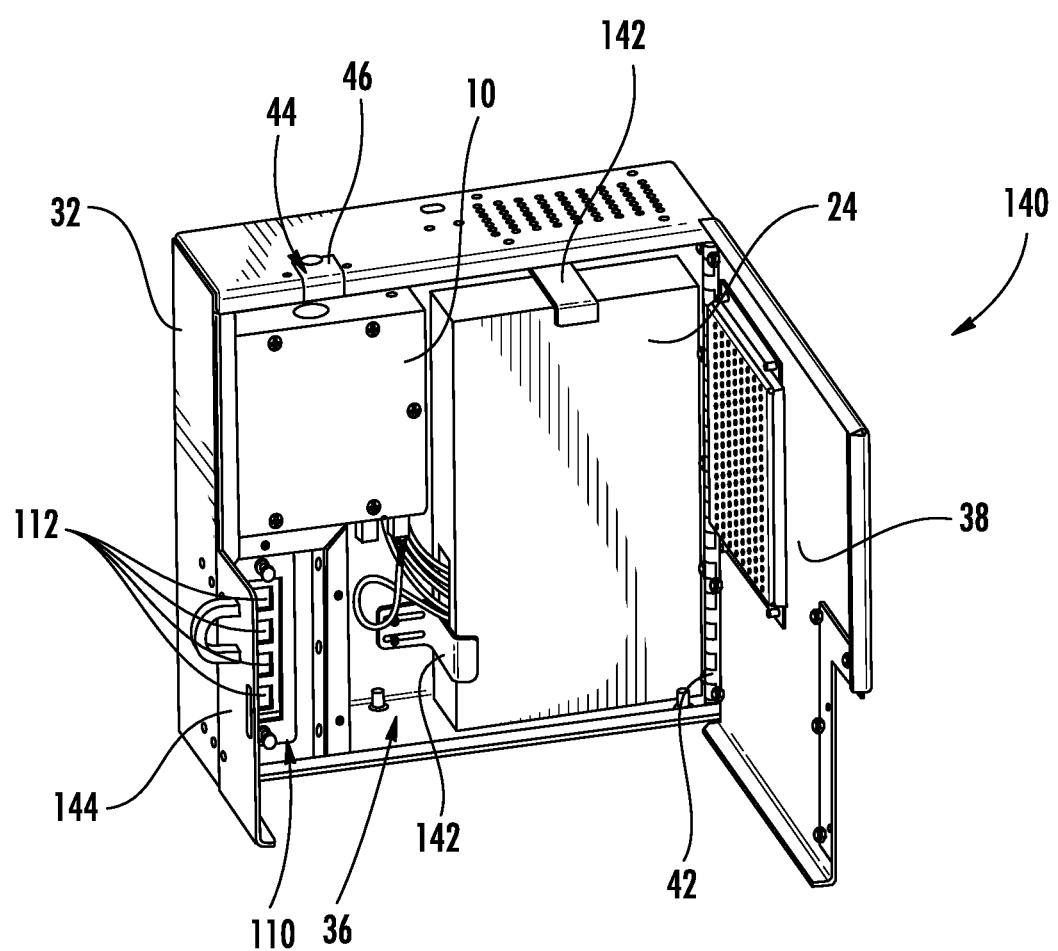
FIG. 12 is a perspective view of the secure equipment box with the lid in the open position according to another exemplary embodiment.

Referring to FIG. 12, an equipment box 140 is shown according to an exemplary embodiment. Equipment box 140 is substantially the same as equipment box 30 except as discussed herein. Equipment box 140 is configured such that ONT 24 is located adjacent to non-secure box 10 as opposed to the stacked arrangement shown in FIG. 3. In addition, box 140 includes a plurality of mounting brackets 142 coupling ONT 24 in the proper position within interior cavity 36. In addition, box 140 includes a door 144 that provides access to patch panel 110 and ports 112. As shown, door 144 is coupled to one of the sidewalls 32 rather than to lid 38.

In various embodiments, a method of converting a non-secure optical network to a secure optical network is provided. At one step an optical cable coupled within a non-secure cable box is provided. At another step, a secure network equipment box is provided. The secure network equipment box may be any of the secure equipment boxes discussed herein. In one embodiment, the secure network equipment box provided includes a plurality of walls defining an interior cavity, an outer surface and an inner surface. In such embodiments, one of the walls is a moveable wall moveable between opened and closed positions to provide access to the interior cavity. In such embodiments, the secure network equipment box includes a locking mechanism configured to lock the moveable wall in the closed position and an opening extending through one of the plurality of walls sized to receive the optical cable. At another step, the non-secure cable box is mounted within the interior of the secure network equipment box such that the optical cable extends through the opening without decoupling the non-secure cable box from the optical cable.

In a specific embodiment of the method of converting a non-secure optical network to a secure optical network, the opening of the secure cable box is a slot formed through one of the plurality of walls. In various embodiments, the slot has an entrance at an edge of the one of the plurality of walls and a closed bottom end located within the sidewall. In such embodiments, the method includes placing the cable into the slot through the entrance and positioning the cable adjacent the closed bottom end. In various embodiments, the method includes inserting a plug into the slot such that a first end of the plug is positioned adjacent the optical cable and a second end of the plug is substantially coplanar with the edge of the one of the plurality of walls. In various embodiments, the method includes coupling the plug to the inner surface of one of the plurality of walls adjacent the slot. In various embodiments, the method includes closing the moveable wall to the closed position with the non-secure cable box within the interior cavity and locking the movable wall in the closed position.

In various embodiments, the equipment boxes discussed herein and in particular the walls of the equipment boxes and the components of the plugs, vent panels and brackets are formed from strong materials that limit or prevent unauthorized access (e.g., by cutting, drilling, bending, breaking, etc.) into the equipment box. In various embodiments, the walls of the equipment boxes and the components of the plugs, vent panels and brackets are formed from a metal material, and may be formed from steel or aluminum or other suitably strong metal material. In various embodiments, the equipment boxes discussed herein are compliant with National Security Telecommunications and Information Systems Security Instruction (NSTISSI) No. 7003.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A secure cable housing system for use within a secure fiber optic communications network comprising:
a non-secure cable box comprising:
a plurality of walls defining a non-secure interior cavity, wherein at least one of the walls of the non-secure cable box is moveable between opened and closed positions to provide access to the non-secure interior cavity;
a first opening through one of the walls configured to receive an optical cable into the non-secure interior cavity, wherein the non-secure cable box is configured to support the optical cable; and
a second opening through one of the walls configured to provide access to at least one optical fiber of the optical cable; and
a secure network equipment box comprising:
a bottom wall;
a plurality of sidewalls coupled to the bottom wall, each sidewall having an outer surface and an inner surface;
a moveable wall coupled to the plurality of sidewalls, wherein the bottom wall, the sidewalls and the moveable wall define a secure interior cavity, wherein the moveable wall is moveable between opened and closed positions to provide access to the secure interior cavity, wherein the non-secure cable box is smaller than the secure interior cavity such that the non-secure cable box fits within the secure interior cavity;

a locking mechanism configured to lock the moveable wall of the secure network equipment box in the closed position; and a slot formed through a first sidewall of the plurality of sidewalls, the slot having an entrance at an edge of the first sidewall and a closed bottom end located within the first sidewall, the slot providing a passage extending between the outer surface and the inner surface of the first sidewall, wherein the slot allows the optical cable to be received through the first sidewall into the secure interior cavity without disconnecting the fiber optic cable from the non-secure box.

2. The secure cable housing system of claim 1 further comprising a plug sized to block a remaining open portion of the slot following receipt of the optical cable through the slot, wherein the plug is configured to be removably coupled to a portion of the inner surface of the first sidewall adjacent the slot to hold the plug in place within the slot.

3. The secure cable housing system of claim 1 wherein the secure network equipment box further comprises:

an opening extending between the outer surface and the inner surface of one of the plurality of sidewalls, the preformed opening configured to provide an exit point for a non-secure optical fiber and a power cable from the secure interior cavity; and a bracket having an outer surface facing the inner surface of the sidewall having the opening, the outer surface of the bracket and the inner surface of the sidewall defining a channel having a first open end adjacent the opening and a second open end opposite the first open end.

4. The secure cable housing system of claim 3 further comprising an optical network terminal located within the secure interior cavity, wherein the power cable extends from the optical network terminal through the second open end into the channel, out of the channel through the first open end of the channel and out of the secure network equipment box through the opening, wherein the non-secure optical fiber also extends through the second open end into the channel, out of the channel through the first open end of the channel and out of the secure network equipment box through the opening.

5. The secure cable housing system of claim 1 wherein the secure network equipment box further comprises:

an array of outer vent openings extending through at least one of the plurality of sidewalls and the moveable wall; and a vent panel positioned between the array of outer vent openings and the secure interior cavity.

6. The secure cable housing system of claim 5, wherein the vent panel includes an array of vent panel openings, wherein the vent panel openings are off-set from the array of outer vent openings such that none of the outer vent openings are aligned with the vent panel openings such that there is not a straight path that extends through one of the outer vent openings and through one of the vent panel openings.

7. The secure cable housing system of claim 5 wherein the vent panel is coupled to the inner surface of the at least one sidewall and top wall including the array of outer vent openings such that the vent panel surrounds the array of outer vent openings.

8. The secure cable housing system of claim 1 wherein the optical cable comprises at least two optical fibers, and wherein the optical fibers furcate from the optical cable within the interior cavity of the non-secure cable box, wherein the non-secure cable box includes an adapter located within the second opening of the non-secure cable box and the adapter provides the access to the at least one optical fiber of the optical cable.

9. The secure cable housing system of claim 1 wherein the secure network equipment box further comprises:

a communication interface located within the secure interior cavity, the communication interface including an internal port and an external port, wherein the internal port is configured to receive a cable from an optical network terminal located within the secure interior cavity, wherein the external port is accessible from an exterior of the secure network equipment box to connect to a cable from a user; and a door moveable between a closed position in which the door blocks access to the external port and an open position in which the access is provided to the external port.

10. The secure cable housing system of claim 9 wherein the locking mechanism is a single lock configured to lock both the door and the top wall.

11. The secure cable housing system of claim 10 wherein the secure network equipment box further comprises:

at least one fastener coupling the top wall to a second sidewall of one of the plurality of sidewalls;

an opening formed through the second sidewall, wherein the external port of the communication interface is accessible through the opening, wherein the door blocks the opening through the second sidewall, the external port and the at least one fastener when in the closed position.

* * * * *